Aug. 19, 1952 K. W. PFLEGER 2,607,851

MOP-UP EQUALIZER

Filed Nov. 18, 1947 7 Sheets-Sheet 1

INVENTOR
K. W. PFLEGER
BY Hugh S. Wertz
ATTORNEY

Aug. 19, 1952 K. W. PFLEGER 2,607,851

MOP-UP EQUALIZER

Filed Nov. 18, 1947 7 Sheets-Sheet 2

INVENTOR
K. W. PFLEGER
BY Hugh S. Wertz
ATTORNEY

INVENTOR
K. W. PFLEGER
BY Hugh S. Wertz
ATTORNEY

FIG. 6
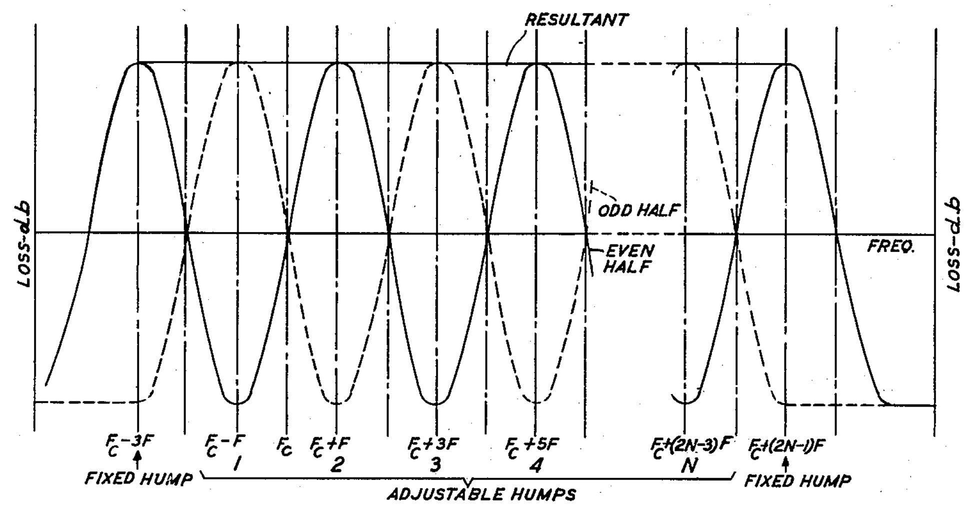
FIG. 8
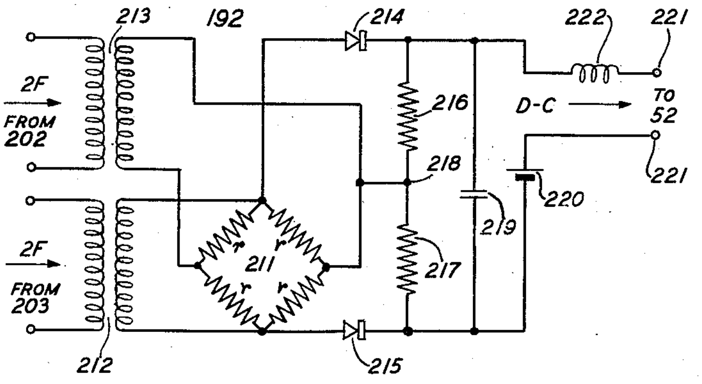
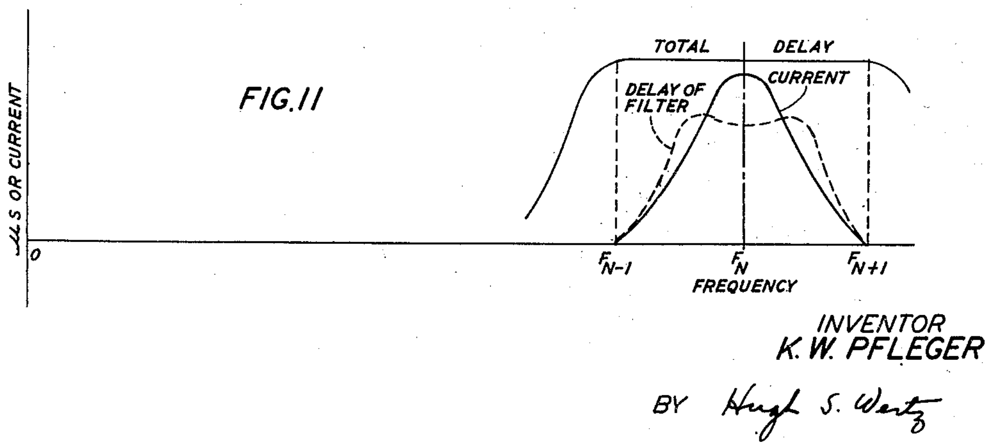
INVENTOR
K. W. PFLEGER
BY Hugh S. Wertz
ATTORNEY Aug. 19, 1952 K. W. PFLEGER 2,607,851

MOP-UP EQUALIZER

Filed Nov. 18, 1947 7 Sheets-Sheet 5

INVENTOR
K. W. PFLEGER
BY Hugh S. Wertz
ATTORNEY

INVENTOR
K.W. PFLEGER
BY Hugh S. Wertz
ATTORNEY

INVENTOR
K. W. PFLEGER
BY Hugh S. Wertz
ATTORNEY

Patented Aug. 19, 1952 2,607,851

UNITED STATES PATENT OFFICE 2,607,851

MOP-UP EQUALIZER

Kenneth W. Pfleger, Arlington, N. J., assignor to Bell Telephone Laboratories, Incorporated, New York, N. Y., a corporation of New York Application November 18, 1947, Serial No. 786,745

7 Claims. (Cl. 178—44)

This invention relates to electric circuits and more particularly to circuits for equalization of waves transmitted over transmission lines or other media.

It is an object of this invention to provide equalization of the "mop-up" type for television impulses transmitted over a path which is so long electrically as to occasion phase shifts between components of different frequencies.

The transmission of television signals involves many problems in consequence of the relatively wide band of frequencies over which the signals are spread. Not the least of these problems is that of equalizing or compensating for phase variations, caused, for example, by temperature changes, on transmission line circuits carrying these wide band signals. It has previously been proposed to provide basic compensation for such phase variations by the use of equalizing networks which introduce fixed envelope delay $d\beta/d\omega$ into the system and to further compensate for these variations by providing adjustable delay equalizers in conjunction with the fixed delay equalizers. After all this equalization, on long broad band cable circuits there still might remain small variable "humps" in the loss versus frequency and envelope delay versus frequency characteristics. The present invention relates to what is called "mop-up" equalization, that is, equalization of these small variable "humps" remaining after the usual equalization has been made.

In a system disclosed in Patent 2,379,744, issued July 3, 1945, to K. W. Pfleger, auxiliary signals or waves transmitted over pilot channels (three are given by way of example) are utilized to operate continuously adjustable networks consisting of stationary impedance elements. The impedance of each of the adjustable elements is changed by means of a current of varying intensity caused to be varied in accordance with the phase difference of two waves of the same frequency ($F_0$) obtained respectively be demodulating two modulated waves transmitted over the television line, each comprising a pilot frequency (a different one for each one of the waves) modulated by the fixed frequency $F_0$ which is lower than either of the pilot frequencies. The two demodulated waves of the frequency $F_0$ are applied to a push-pull phase detector after having been initially adjusted by phase shifters to be in quadrature. As long as this phase relation is maintained, the output of the phase detector is zero, regardless of level changes on the television line. When the phase relation between the two demodulated waves changes due to variations in delay over the line, the balance is destroyed and the output current of the phase detector has an appreciable magnitude in one direction or the other. When the phase relation between the input currents for the phase detector changes in the opposite direction, the direction of output current is reversed. These output currents are, as pointed out above, utilized to control the impedances of variable elements in an adjustable equalizer. A first pilot frequency $F_1$ is located at or slightly below the lower edge of the television band, a second pilot frequency $F_2$ is located about in the center of the band (preferably in a dead portion of the television band), and a third at or slightly above the upper edge of the television band. The delay distortion over the frequency range $F_1$ to $F_2$ is corrected with the aid of one of the phase detectors while the distortion over the frequency range $F_2$ to $F_3$ is corrected with the aid of the second phase detector. In the system described in the above-mentioned Pfleger patent, the sidebands are transmitted over the cable or other path and utilized with the pilot frequency waves at the receiving end to produce waves at the envelope frequency which waves are applied to the phase detectors.

In accordance with the present invention, which in one of its aspects is a special case of and an extension of the patented Pfleger arrangement, both automatic delay distortion and automatic attenuation distortion are compensated by the same pilot frequencies, of which a great number are provided, they preferably being located throughout the television band at intervals corresponding to the line scanning frequency of the television image. Due to the relatively close spacing of the pilot frequencies, only the latter need be transmitted and the step of modulation (in the above-identified patented arrangement) is not necessary. The pilot frequencies are utilized at the receiving station to vary the magnitudes of "humps" of loss which are inserted into the system at the proper frequencies to give substantially flat compensation of the attenuation versus frequency and envelope delay versus frequency characteristics.

The invention will be more readily understood by referring to the following description taken in connection with the accompanying drawings forming a part thereof in which:

Fig. 6 is a graphical representation to aid in understanding the invention;

Fig. 8 is a circuit diagram of a phase detector which can be used in the control circuits of Fig. 7;

Fig. 11 is a graphical representation to aid in understanding the operation of the arrangement of Fig. 10.

Figure 1:
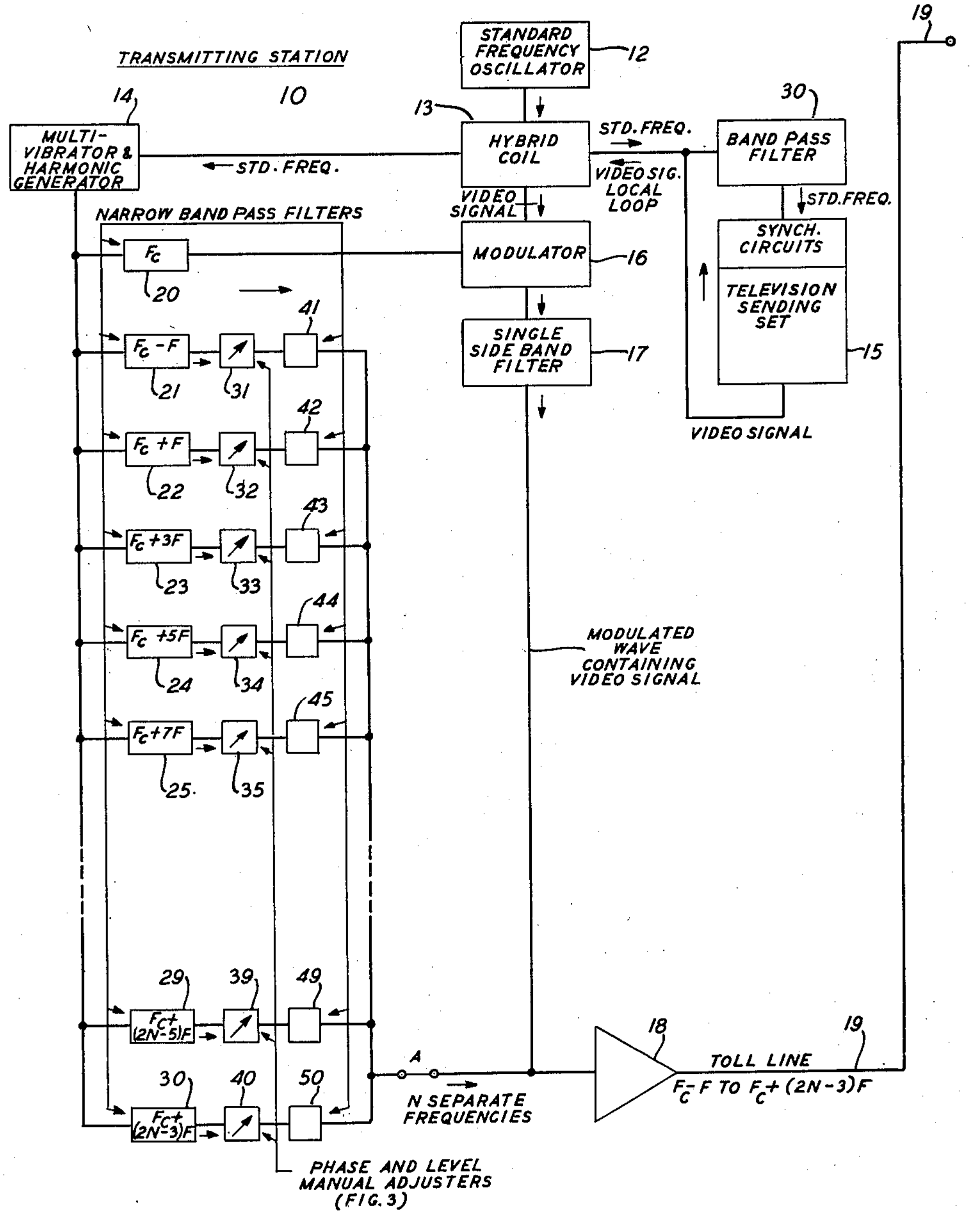
Fig. 1 is a schematic block diagram of a portion of the sending end apparatus of a television system including the sending end equipment of a "mop-up" equalizer in accordance with the invention.
Figure 2:
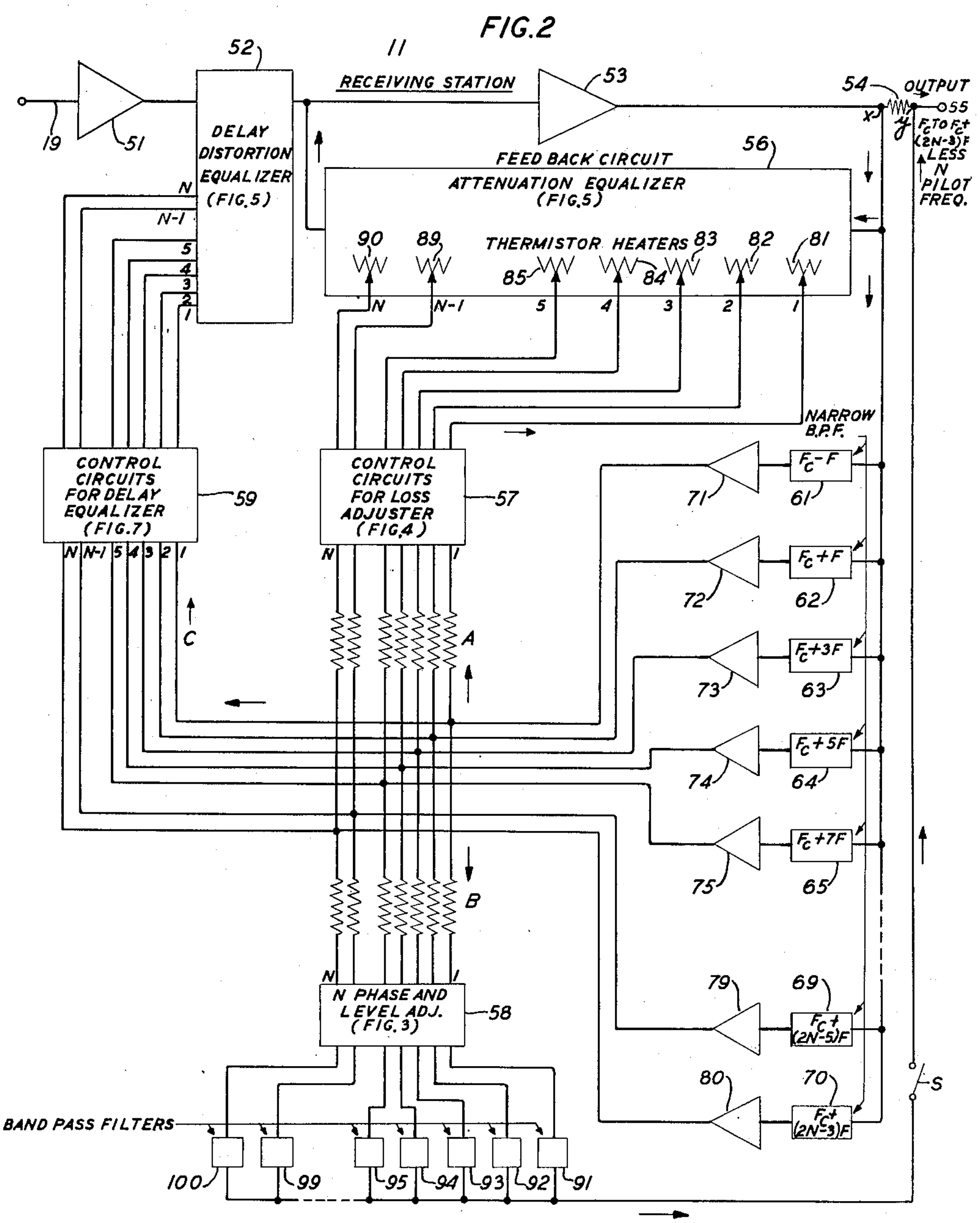
Fig. 2 is a schematic block diagram of receiving end apparatus adapted to be utilized with the sending end equipment shown in Fig. 1.

Referring more specifically to the drawings, Figs. 1 and 2 show, in block diagram form for purposes of illustrating the invention, sending and receiving end portions 10 and 11, respectively, of a television system in which mop-up equalization of loss and envelope delay are employed. For simplicity in the drawings, details of the equipment for generating, transmitting and utilizing the video signal at the receiving station to produce an image of the object have not been shown since the present invention is concerned primarily with the loss and delay equalization of the television signals.

Figure 3:
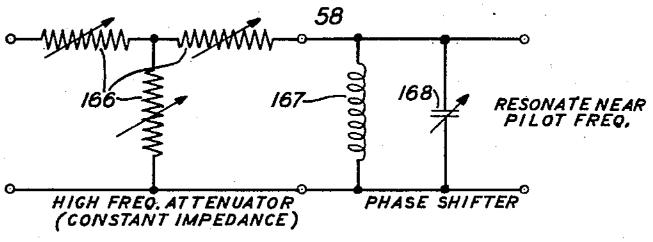
Fig. 3 is a circuit diagram of one of the manual level and phase adjusters forming part of the equipment shown in Fig. 1 and Fig. 2.

Referring first to the sending end equipment 10 shown in Fig. 1, a standard frequency oscillator 12 generates oscillations of, for example, 1000 cycles per second, and this generated wave is applied through a hybrid coil 13 to a multivibrator and harmonic generator 14 of any suitable form to produce a group of accurate frequency waves. (The standard frequency wave can also be applied through the filter 30 to the synchronizing circuits forming part of the television sending set 15, for control purposes.) By means of a multiplicity (for example there might be 191 for television having 441 lines and 30 frames per second) of narrow band-pass filters 20, 21, 22, 23, 24, 25 . . . 29, 30 tuned to frequencies separated by a frequency of 13.23 kilocycles (the line scanning frequency), a multiplicity of frequencies are selected as follows: $F_c$ (carrier frequency—for example, 300 kilocycles per second), $F_c-F$ (where F is one-half line scanning frequency), $$F_c+F,\ F_c-3F,\ F_c+5F,\ \ldots\ F_c+(2N-3)F$$

Where the lower sideband of the television signal is suppressed, it is necessary to transmit relatively few pilot frequencies below $F_c$. The carrier frequency $F_c$ is modulated in the modulator 16 with a video signal passing the hybrid coil 13 from the television sending set 15 and the resultant modulated wave is passed through a single sideband filter 17 and the amplifier 18 to the toll line 19. The selected frequencies $F_c-F$ up to $F_c+(2N-3)F$ are each passed through an individual one of the manually-adjusted phase and level adjusters 31, 32, 33, 34, 35 . . . 39, 40 (to compensate for any phase or level change in the filters). Suitable phase and level adjusters are shown in Fig. 3 and will be described below. Each of the selected frequencies is then passed through an individual one of the narrow band-pass filters 41, 42, 43, 44, 45 . . . 49, 50 to prevent that frequency from interacting with the phase or level adjuster for any of the other frequencies. Then all of the selected frequencies are applied through the amplifier 18 to the toll line 19 and transmitted to the receiving station 11 shown in Fig. 2.

At the receiving station 11 of Fig. 2, all of the selected (pilot) frequencies ($F_c-F$ to $F_c+(2N-3)F$, inclusive) as well as the transmitted modulated wave containing the video signals are passed through an amplifier 51 and then through a delay distortion equalizer 52 (which will be described more fully below in connection with Fig. 5) and another amplifier 53. The output current of the amplifier 53 is divided into three parts as follows: (1) a portion going through a resistance pad 54 to an output circuit terminal 55 to which are applied (by means to be described below) the pilot frequencies to oppose those in the amplifier 53 and thus leave only the transmitted modulated wave containing the video signal, (2) a portion going through a feedback circuit containing variable attenuation equalizers 56, and (3) a portion going through a multiplicity of parallel circuits each comprising one of the narrow band-pass filters 61, 62, 63, 64, 65 . . . 69, 70 and one of the amplifiers 71, 72, 73, 74, 75 . . . 79, 80. The output current from each of the last-mentioned amplifiers is then divided into three parts, (1) a portion (A) going through an individual one of the control circuits 57 for the loss adjuster (which circuits will be described more fully below in connection with Fig. 4) which varies the current through an individual one of the thermistor heaters 81, 82, 83, 84, 85 . . . 89, 90 in one of the attenuation equalizers of the feedback circuit 56, (2) a portion (B) going through individual phase and level adjusters 58 (which will be described more fully below in connection with Fig. 3) and narrow band-pass filters 91, 92, 93, 94, 95 . . . 99, 100 to the output circuit terminal 55 whereby the pilot frequencies are adjusted in phase and amplitude to oppose those in the output circuit of amplifier 53, and (3) a portion (C) going to an individual one of the control circuits 59 (which will be described more fully below in connection with Fig. 7) for varying in each case the power of an individual heater for an individual impedance member of the distortion equalizer 52 shown in Fig. 5.

Figure 5:
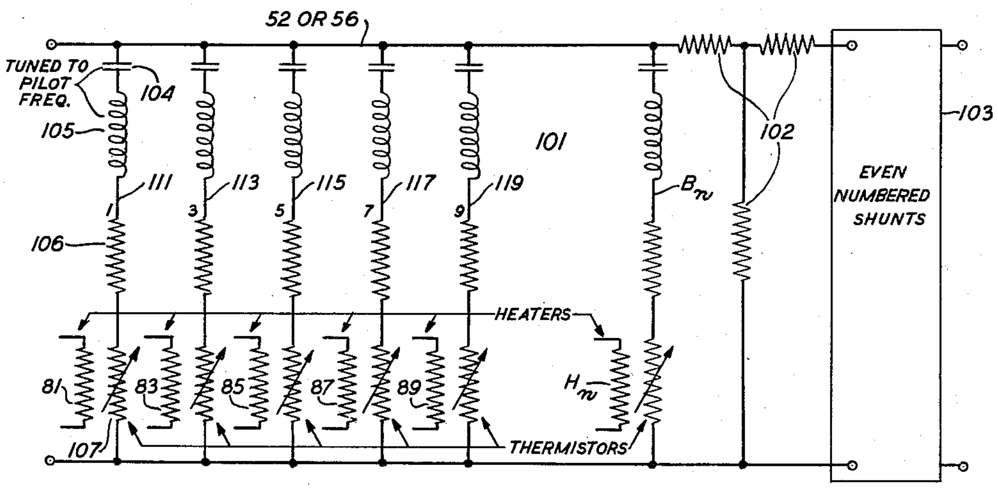
Fig. 5 is a circuit diagram of a group of typical distortion equilizers suitable for use in the arrangement of Fig. 2.

Referring now to Fig. 5, this figure shows one form of equalizer which may be used as the delay distortion equalizer 52 or the attenuation equalizer 56. It comprises a first section 101 consisting of a multiplicity of parallel connected branches 111, 113, 115, 117 and 119, . . . $B_n$ respectively resonating at a different one of the odd-numbered pilot frequencies and a thermistor, followed after resistance pad 102 by a section 103 like the first section 101 but tuned at the even-numbered pilot frequencies. Considering one of said branches, as, for example, the branch 111, it comprises a capacitor member 104, an inductance member 105, resistance member 106 and a thermistor member 107, the other parallel branches 113, 115, 117, 119, . . . $B_n$, and also those in the even-numbered section 103 being similar to the branch 111 except that the frequency of the tuned circuit varies. By varying the resistance of a particular thermistor 107 by varying the current in its corresponding heater 81, 83, 85, 87, 89, . . . $H_n$, the magnitude of the "hump of loss" inserted into the system at that pilot frequency can be varied. The resultant of the two sections 101 and 103 is substantially flat for the over-all frequency range. As the arrangement shown in Fig. 5 produces both attenuation and delay it can be used either as a delay distortion equalizer 52 or attenuation equalizer 56.

When the thermistors 107 are all at some average value, it is desirable that the receiving circuit of Fig. 2 shall have an over-all flat characteristic. Since the network of Fig. 5 produces peaks of loss (or attenuation) at each odd-numbered resonant frequency, it is necessary to have in connection therewith a similar circuit 103 having the parallel branches thereof tuned to even-numbered pilot frequencies. At average values of the thermistor, the loss "hump" has about the same peak values at all pilot frequencies and the loss characteristic due to the one network is complementary to that of the other so that over-all transmission is flat when all the thermistors are at an average value of resistance. The use of sinusoidal "humps" is advantageous. In general, for average values of thermistors or other possible variables, the odd-numbered network 101 produces an over-all loss, for example, as shown by the dash line curve in Fig. 6. The even-numbered network 103 gives the complementary loss shown by the full line curve so that the resultant is flat for the frequency range of interest. By variations from the average of one or more networks, the resultant can be made to have either narrow or broad "humps" depending on the changes occurring in adjacent channels. On Fig. 6, which is a plot of loss versus frequency, the loss curves for both halves of the equalizer and the resultant have been shifted to refer them to an arbitrary zero loss axis in order to facilitate comparison. A curve similar to Fig. 6 can be drawn for delay versus frequency.

When simple networks of the type shown in Fig. 5 are used for loss equalizers, delay "humps" are also produced and when they are used for delay equalizers, loss "humps" are also produced. Resonant shunts are shown in Fig. 5 merely to illustrate how the pilot channels can control "humps" of loss or delay. In practice, some other form of tuned network might be preferable. As an example of an attenuation equalizer which produces practically no delay distortion, reference will now be made to Fig. 10.

Figure 10:
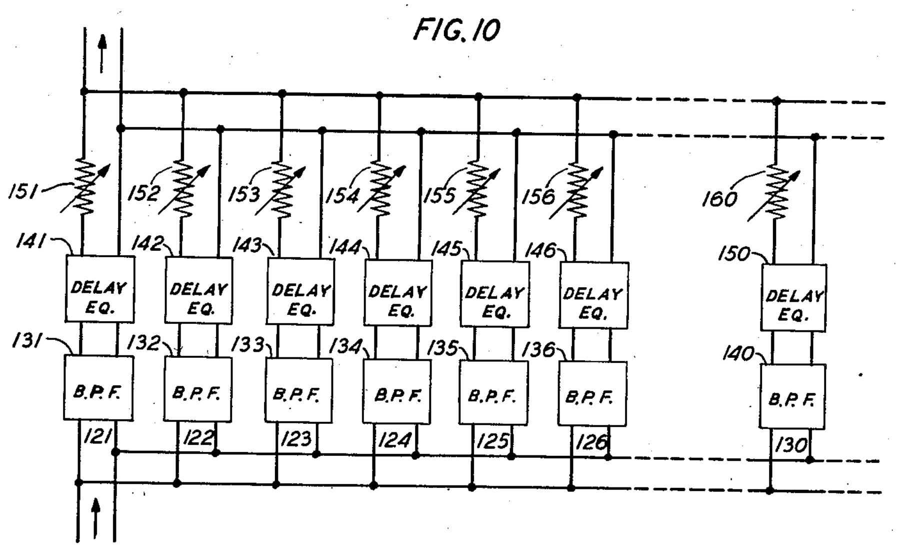
Fig. 10 is a schematic block diagram of an attenuation equalizer which produces practically no delay distortion.

In the arrangement of Fig. 10 there is shown an attenuation equalizer which produces substantially no delay distortion. The equalizer of Fig. 10 comprises a plurality of parallel connected branches 121, 122, 123, 124, 125, 126 . . . 130 each consisting of a respective band-pass filter 131, 132, 133, 134, 135, 136 . . . or 140 tuned to a different pilot frequency and adapted to pass a nearly sinusoidal "hump" symmetrical around the tuned frequency, a respective fixed delay equalizer 141, 142, 143, 144, 145, 146 . . . or 150 for compensating for any delay in the corresponding filter and a respective variable resistor element 151, 152, 153, 154, 155, 156 . . . or 160 (which may be thermistors) for varying the intensity of the "hump." The equalizer of Fig. 10 can also be in two sections like the one of Fig. 5, one section having the odd-numbered branches and the other section having the even-numbered branches. By means of this arrangement, "humps" of correct amount of loss can be inserted into the system at the proper frequency to give substantially flat compensation.

The characteristics of the $n$'th channel are graphically shown in Fig. 11, the characteristics of the various channels being similar. The current magnitude when plotted versus frequency has a maximum at $F_n$, the $n$'th pilot frequency, and is preferably negligible at and beyond frequency $F_{n+1}$ and $F_{n-1}$ respectively corresponding to the pilot channels $n+1$ or $n-1$. The delay of the filter alone has "humps" as shown by the dash line curve of Fig. 11. It is for this reason that delay equalizers are included in each channel of the arrangement of Fig. 10 to make the delay constant over the transmitted frequency range of the channel. The total delay is the same for each channel in its transmitted frequency range. The resistance (151 . . . 160) in the output of each of the parallel connected branches of the circuit of Fig. 10 can be varied. It is assumed that all impedances as seen from the resistances 151 . . . 160 have been adjusted to have zero angle which can be done by using constant K-type networks. Therefore these resistances 151 to 160 control the relative outputs of the channels without altering the delay or the shape of the amplitude versus frequency characteristics. When the resistances are set so that each channel transmits the same current magnitude at its mid-band frequency, and when the amplitude versus frequency characteristic of each channel above its mid-band frequency is complementary to that of the next higher channel below its mid-band frequency, then the over-all transmission versus frequency characteristic for the entire circuit of Fig. 10 will be flat from $F_1$ to the mid-band frequency of the highest channel. Gain or loss "humps" can next be inserted at will by varying the adjustable resistors 151 to 160 with no effect on the delay since all channels have the same constant delay. Where the number of channels in parallel is great there will be considerable loss due to the shunting effects of so many branches at each junction point. This may be reduced if necessary by the use of amplification and the subdivision of channels into groups, each with a separate amplifier if necessary. The resistors 151 to 160 can be thermistors operated by heaters similar to those in Fig. 5, if desired.

A combination of an equalizer of Fig. 10 with an equalizer which produces both delay and attenuation effects or delay effects only permits compensation of any desired delay or attenuation distortions, either separately or together.

In the circuit of Fig. 2 the delay distortion equalizer 52 (such as that shown in Fig. 5 or Fig. 10) is shown at the input to the amplifier 53 in order to prevent unfavorable phase relations from arising in the feedback circuit including the attenuation equalizer 56. It is intended that small incidental loss variations caused by the delay network be automatically compensated by the attenuation equalizer and incidental delay variations of the latter, if not too great be compensated for by the delay equalizers. By providing practically instantaneous controls using fast-acting thermistors in the variable networks, the two types of compensation can be made to cooperate simultaneously in producing over-all flat loss and delay versus frequency characteristics.

Figure 4:
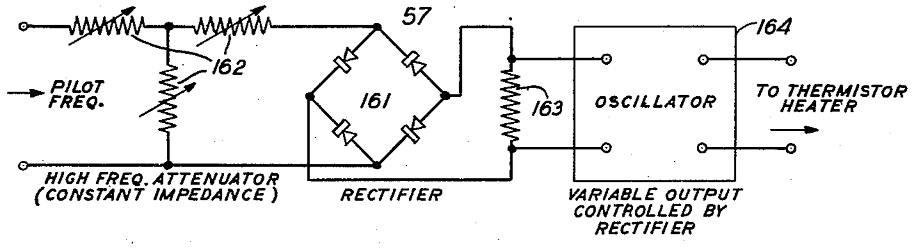
Fig. 4 is a circuit diagram of one of the control circuits forming part of the arrangement of Fig. 2.

Each of the control circuits 57 in branch A of the circuit of Fig. 2 can be of any suitable form. An example of one satisfactory circuit is shown in Fig. 4. In the arrangement of Fig. 4, each pilot frequency is applied to a rectifier 161 through a high frequency attenuator 162 having constant impedance. The output of the rectifier appearing across the resistor 163 is applied to any convenient form of oscillator 164 to control the variable output to heat any one of the thermistors 81, 82, 83 . . . 90. The connections in Fig. 4 should be poled so that a sudden increase in level of a pilot channel on the line causes the corresponding thermistor resistance to vary in a direction to increase the amount of negative feedback (through the attenuation equalizer 56) permitted at this frequency, until the level of the pilot frequency at the amplifier output is reduced to the former value. A similar procedure follows with opposite signs when the pilot level decreases.

The branch B of circuit shown in Fig. 2 includes a multiplicity of phase and level adjusters 58. A suitable manual level and phase adjuster is shown in Fig. 3. This comprises a high frequency attenuator 166, a shunt-connected inductance member 167 and variable capacitor member 168. The capacity 168 can be varied to produce the level and phase adjustment desired.

Figure 7:
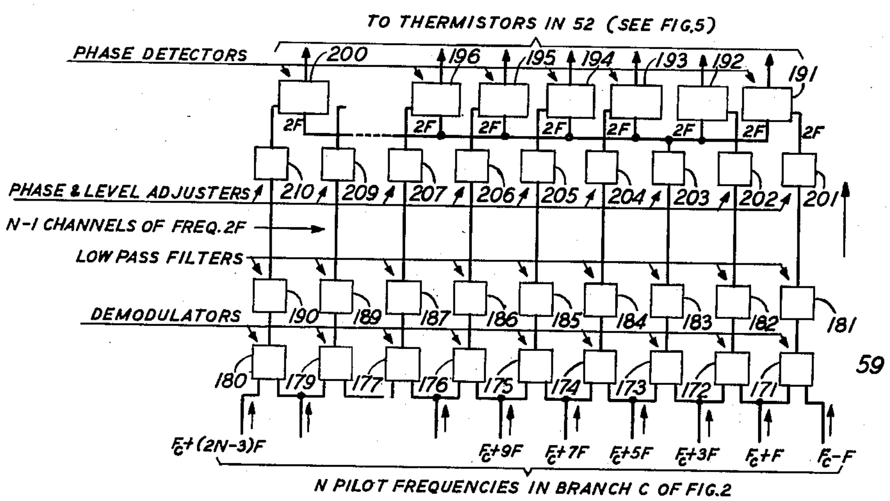
Fig. 7 is a schematic block diagram of control circuits which can be utilized in the arrangement of Fig. 2.

Reference will now be made to Fig. 7 which is a single line schematic diagram of a control circuit suitable for use in the path C of the circuit shown in Fig. 2, or, in other words, it can be used as the control circuit 59 of Fig. 2. Before describing the circuit arrangement of Fig. 7 it seems best to describe its function. Suppose the circuit has been lined up initially to have zero delay distortion. Suddenly the phases of the N pilot channels are shifted respectively by increments $\beta_1$, $\beta_2$, $\beta_3$, etc. where the subscript in each case denotes the number of the channel. It is assumed satisfactory if the automatic delay distortion compensator so operates that $$\beta_2-\beta_1=\beta_3-\beta_2=\beta_4-\beta_3$$

etc. because, with equally spaced pilot frequencies, this keeps $\Delta\beta/\Delta\omega$ a constant over the entire transmitted frequency range, where $$\Delta\beta=\beta_2-\beta_1=\beta_3-\beta_2$$

etc. and $\Delta\omega=2\pi\ 13{,}230=4\pi F$. The use of $$\frac{\Delta\beta}{\Delta\omega}$$

to represent delay instead of $$\frac{d\beta}{d\omega}$$

is assumed satisfactory so long as wiggles in the line characteristic have a periodicity considerably greater than 2F. It is desirable that changes introduced by the delay adjuster 52 shall be gradual between pilot frequencies so that no sharp irregularities are introduced. It happens that when any two frequencies $f_1$ and $f_2$ beat together in a demodulator and the difference frequency is considered, any sudden phase increments in $f_1$ and $f_2$, such as $\beta_1$ and $\beta_2$, respectively, appear in the difference frequency as an increment equal to $\beta_2-\beta_1$. In order to provide a test for $\beta_2-\beta_1$, $\beta_3-\beta_2$, $\beta_4-\beta_3$, etc. the N pilot channels are connected to $N-1$ demodulators as in the arrangement of Fig. 7. These demodulators are designated by the reference characters 171, 172, 173, 174, 175, 176, 177 . . . 179, 180. At the outputs of the demodulators are low-pass filters 181, 182, 183, 184, 185, 186, 187 . . . 189, 190, and at the outputs of all of these filters the difference frequency, 2F, appears. In each channel, the phase shift is respectively equal (within a constant) to $\beta_2-\beta_1$, $\beta_3-\beta_2$, $\beta_4-\beta_3$, etc. In order to test these phase increments for equality they are compared to some standard, for example, to $\beta_4-\beta_3$ appearing at the output of low-pass filter 183, or in similar fashion, any other filter output can be selected. An accurate means of detecting phase shift is the 90-degree, push-pull detector shown in Fig. 8. A phase detector such as that shown in Fig. 8 is sensitive to .01 degree even when level changes occur in the two inputs of magnitude about one-half decibel. For the frequency interval $2F=13{,}230$ cycles, the envelope delay sensitivity is .0021 microsecond. In order to compare phase changes at the output of low-pass filter 183 with phase changes in the output of the other low-pass filters, $N-2$ phase detectors 191, 192, 193, 194, 195, 196, . . . 200 are arranged as shown in Fig. 7, each deriving one input from low-pass filter 183 and the other input from some other low-pass filter (181, 182, 184, 185, 186, 187 . . . 189 or 190). In tandem with these connections are connected $N-1$ manual phase and level adjusters 201, 202, 203, 204, 205, 206, 207 . . . 209, 210 so set that when no delay distortion exists on the line, the two inputs of each phase detector are 90 degrees apart, and the direct current output is then zero. (It is possible to omit the phase adjuster 203 if the others have sufficient range.)

The phase detector (192 for example) shown in Fig. 8 comprises a resistance bridge 211 across the upper and lower corners of which is applied one wave of frequency 2F from transformer 212 connected to one phase and level adjuster (201 to 210) of Fig. 7 and across the right and left corners of which is applied a wave of frequency 2F from transformer 213 connected to another one of the phase and level adjusters 201 to 210. The upper and lower corners are connected respectively to rectifiers 214 and 215. Between the positive terminals of these rectifiers is connected a series circuit comprising resistors 216 and 217 the common terminal 218 of which is connected to the right-hand corner of the bridge 211. Serially connected resistors 216 and 217 are shunted by a condenser 219. The operation of circuits like that shown in Fig. 8 is well known and will only be given a brief description here.

The current in the upper right arm of the bridge 211 is the vector sum of the two sinusoidal waves from sources 202 and 203, and the current in the lower right arm of the bridge 211 is the vector difference of these waves. When the magnitudes of the two inputs are equal, the vector sum may be expressed by $$E_S=2A\cos\frac{\theta}{2}$$

and the vector difference by $$E_D=2A\sin\frac{\theta}{2}$$

where A equals the magnitude constant of each component and $\theta$ equals the phase angle between them. Now the voltages impressed on rectifiers 214 and 215 are respectively proportional to the values $E_S$ and $E_D$, as are the rectified waves flowing in resistors 216 and 217. A low-pass filter consisting of shunt condenser 219 and series inductance 222 removes alternating components from the output wave flowing over conductors 221. Due to the differential combination of the voltages across 216 and 217 the open circuit output voltage across conductor 221 is proportional to $$\left(\cos\frac{\theta}{2}-\frac{\theta}{2}\right)$$

plus the voltage of a biasing battery 220. When $\theta=90°$ and a thermistor heater or load is connected to leads 221 the current flowing therein is due entirely to the voltage of battery 220. But if the two input volages are not in 90-degree relationship the load current is increased or decreased by an amount proportional to $$\left(\cos\frac{\theta}{2}-\sin\frac{\theta}{2}\right)$$

Returning again to the control circuit of Fig. 7, it will be noted that when $\beta_3-\beta_2\neq\beta_4-\beta_3$, there is a direct current component in the output from phase detector 192 superimposed upon the current from battery 220, so that the magnitude and direction of the superimposed component are respectively indications of the magnitude and sign of the inequality of the two phase increments. Consequently the resultant direct current in leads 221 serves as an indication of the amount of the required variable delay for compensation in the frequency region between $F_c+F$ and $F_c+3F$ in order to shift phases so that finally $\beta_3-\beta_2=\beta_4-\beta_3$. For example, suppose it is desired to increase $\beta_3-\beta_2$. A phase "hump" similar in shape to the attenuation "hump" in Fig. 6 with a peak at $F_c+3F$ shown by the dashed curve can be inserted by some suitable network. In terms of envelope delay $$\frac{d\beta}{d\omega}$$

this phase characteristic would have a delay "hump" at about $F_c+2F$. It is thus evident that the various phase detectors (191 to 200) are to control delay "humps" having peak values about midway between the associated pilot frequencies. Fig. 6 can be assumed to apply to desirable delay equalizers at average conditions if the "humps" are taken to denote phase shift instead of loss. It is obvious that as the device of this sort makes $\beta_3-\beta_2=\beta_4-\beta_3$, it also holds $$\beta_4-\beta_3=\beta_2-\beta_1=\beta_3-\beta_2=\beta_5-\beta_4=\beta_6-\beta_5$$

etc. Theoutputs of the phase detectors 191 to 200 can be used to control thermistors in the delay distortion equalizer 52 shown in Fig. 5.

In lining up and adjusting the apparatus, the relative phases of the power channel should be definitely adjusted at the sending end in such a manner as not to cause serious resultant peak values on the line. The sending arrangments should be stable so that this phase relationship remains fixed within about ±.01 degree in each case in order not to produce appreciable subsequent errors in regulation. For the same reason, the output levels of the pilot frequencies should remain constant within about ±.05 decibel. Consequently, temperature control of all filters and phase shifters is desirable and also stabilization of the harmonic generator 14. It is desirable to give all sending circuits the same adjustment throughout the plant so that they are readily interchangeable. The receiving arrangement of Fig. 2 is connected to the sending arrangement of Fig. 1 through zero line and the pilot channels and manual adjustments of the receiving arrangement are set so that complementary parts of the delay and loss adjusters give over-all flat characteristics. It is also important for certain parts of the receiving circuit to be kept at constant temperature and to be as stable as the sending circuits. After adjusting a receiving circuit it can be removed to its final destination. Each section of circuit to be controlled by the automatic device is first given as flat an adjustment of loss and delay as possible with the basic equalizers of the system before the automatic device is added. Consequently, straightaway loss and delay distortion measurements are desired. The narrow band-pass filters which separate the pilot channels from the television current should have high impedance to prevent unfavorable shunt loss and delay of the through transmission.

It is obvious that the amount of apparatus for one sending and one receiving circuit as shown in Figs. 1 and 2 is considerable. It is given below in the table in the column headed Case I. This table also gives two other cases, Case II and Case III which will be explained hereinafter.

If the carrier is an odd multiple of half the line speed, for example 297.7 kilocycles, and if the multivibrator 14 gives only harmonics of the line speed, they all fall in the centers of the dead bands. In this case, narrow band-pass filters are not needed in the sending circuit of each power channel, but an additional multivibrator may be necessary as the carrier may have to be generated separately. The amplitude and phases of all the pilot channels can be adjusted by a single wide band equalizer. In the receiving circuit of Fig. 2, the N stable amplifiers 71 to 80 inclusive can be omitted if the level at the point $x$ in Fig. 2 is made high enough. Instead, a single wide band amplifier can be inserted in the leads to switch S in Fig. 2. With these simplifications the apparatus can be reduced to the amount shown in the column headed Case II in the table. However, the harmonic generators have to be made all alike in order to be interchanegable. Also, the 2064-kilocycle pilot frequency of the basic equalizers has to be shifted to avoid conflict with the television signals. If in a particular system it turns out that the attenuation equalizers 56 can be made to take care of delay equalization without the need of separate controls for phase shift, further reduction in apparatus can be made to the amount shown in the column headed Case III in the table.

Moreover, a considerable amount of expensive receiving end apparatus can be saved if the control circuit for only one power channel is used to make all adjustments for a group of channels but it is then necessary to switch the control circuit input continually to the outputs of the various receiving pilot channel filters in this group, while switching the control circuits output or outputs to the respective variable elements of the associated tuned networks. With this arrangement instantaneous control is sacrificed in favor of cheapness, and automatic adjustments on each channel are made at regular intervals or perhaps every few minutes.

Figure 9:
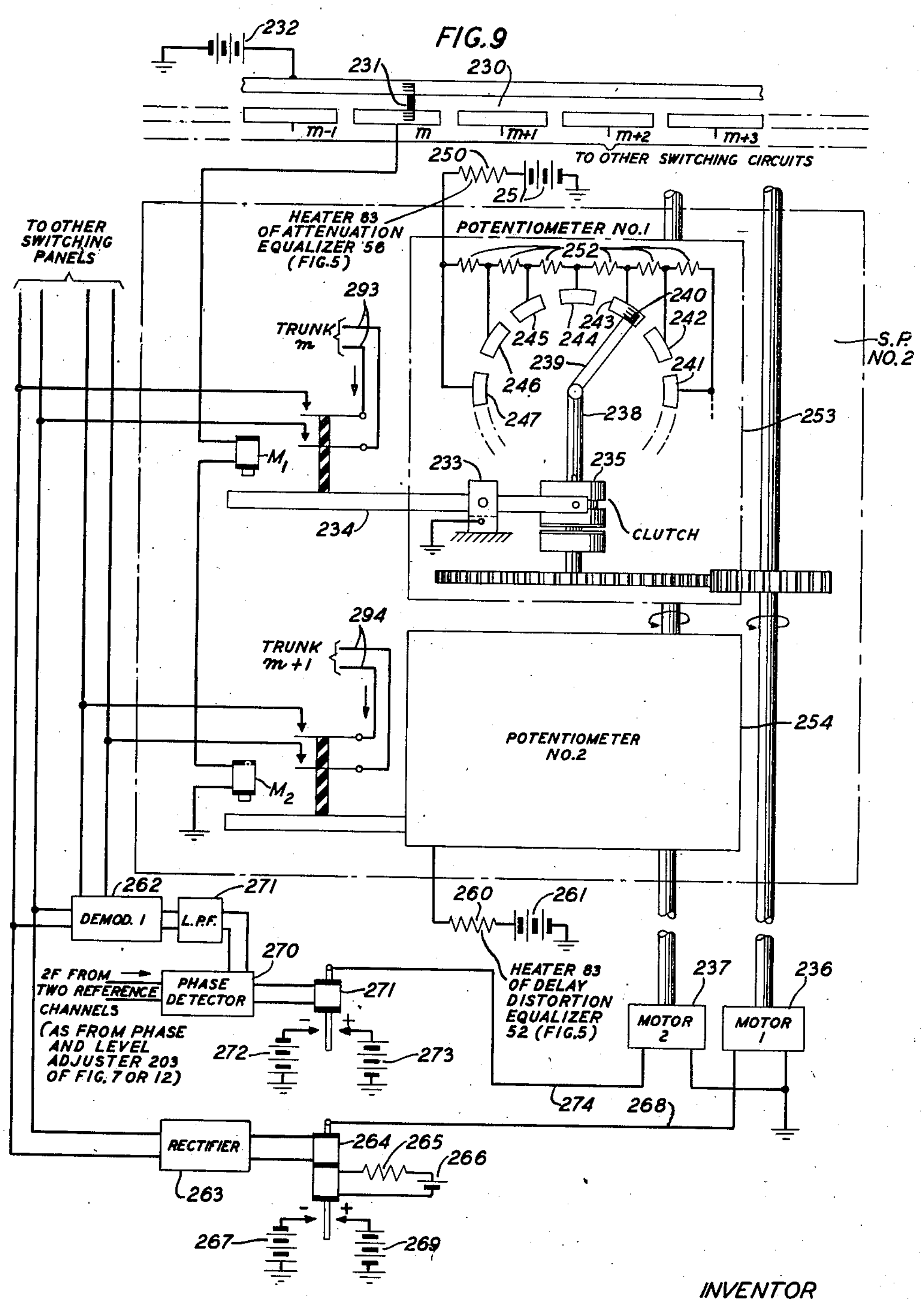
Fig. 9 is a schematic circuit diagram of a switching arrangement for making unnecessary a considerable amount of the receiving end apparatus shown in Fig. 2.
Figure 12:
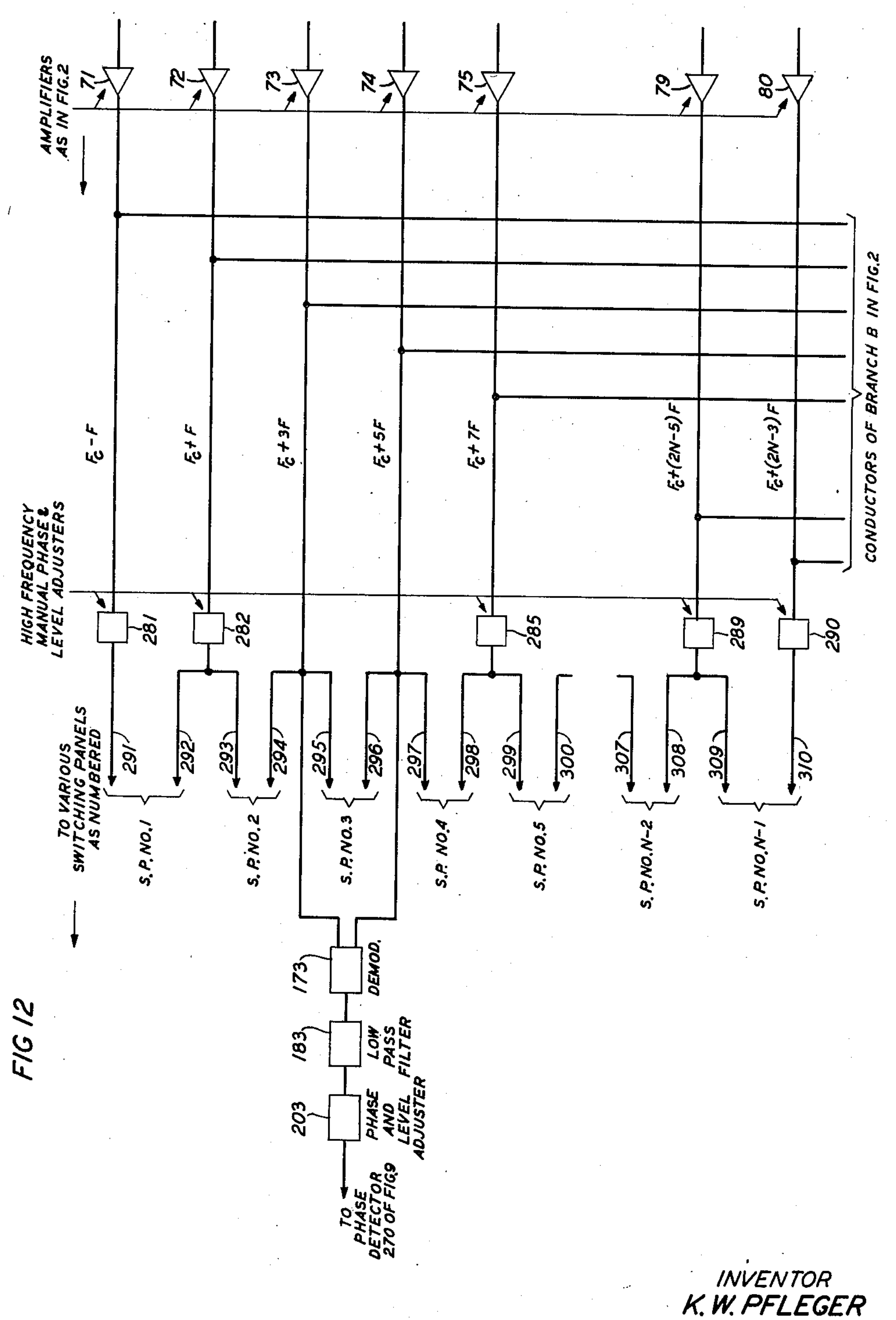
Fig. 12 is a circuit diagram illustrating how the switching arrangement of Fig. 9 is connected into the receiving circuit of Fig. 2.

A switching circuit making use of the changes and modifications suggested above is shown in Fig. 9 and the manner in which it is connected into the receiving circuit of Fig. 2 is shown in Fig. 12. In this arrangement a group of N pilot channels controls an attenuation adjuster and a delay adjuster covering a wide range of frequencies, using one rectifier and one phase detector. The circuit arrangement shown in Fig. 9 represents the $m$'th switching circuit, of which a total of N is required. A distributor 230 having N segments ($m-1$, $m$, $m+1$ etc.) is driven by a motor (not shown) and direct current flows from source 232 through the brush 231 and the $m$'th segment to operate switching circuits associated with each segment. The magnets $M_1$ and $M_2$ for the $m$'th switching circuit (for example, the switching panel designated S. P. No. 2 in Fig. 9) are then energized to close their contacts which are respectively associated with trunks 293 and 294.

Trunks 293 and 294 are here shown as two wires but on Fig. 12 are shown as one wire as the latter figure is a single line diagram showing how the N pilot frequencies of Fig. 2 after leaving amplifiers 71, 72, 73 . . . 80 are trunked to the various switching panels. Thus trunks 291 and 292 go to the first switching panel (S. P. No. 1), trunks 293 and 294 go to the second switching panel (S. P. No. 2), etc. Fig. 12 shows that two pilot frequencies, for example, $F_c+3F$ and $F_c+5F$ are applied to the demodulator 173. The frequency 2F is obtained at the demodulator output, is passed through low-pass filter 183 to remove high frequencies and through phase and level adjuster 203, these members being similar to apparatus shown in Figs. 3 and 7. This frequency 2F is permanently applied to the phase detector 270 shown in Fig. 9. The phase and level adjuster 203 is set so that when switching circuit No. 3 is connected to trunks 295 and 296 of Fig. 12, the two currents entering the phase detector 270 of Fig. 9 are 90 degrees out of phase for an average loss and delay adjustment. The other phase and level adjusters of Fig. 12 (281, 282, 285, 289, 290 which can be of the form shown in Fig. 3) operate at line frequencies and are also set to give the 90-degree relationship between the two inputs of the phase detector of Fig. 9 when an average loss and delay adjustment is desired. The lines carrying the pilots $F_c+3F$ and $F_c+5F$ need no phase and level adjusters in this position because a phase and level adjuster 203 is provided.

The same magnets $M_1$ and $M_2$ which connect the switching circuit to a pair of pilot frequency channels also operate clutch 235 (and a similar one in the apparatus for operating potentiometer No. 2 shown as a box in the arrangement of Fig. 9). It will be understood that potentiometer No. 2 is similar to potentiometer No. 1 shown (within dashed lines) immediately above it. The operation of the clutch 235 closes a mechanical circuit which permits motor No. 1 (element 236 in the drawing) to turn the potentiometer No. 1 (element shown within the dash line box 253 in the drawing) and the operation of the clutch in potentiometer No. 2 (the element shown within the box 254) causes motor No. 2 (element 237) to turn the rotating element in potentiometer No. 2. Potentiometer No. 1 comprises a rotating shaft 238 which drives a crank 239 having a brush 240 on one end thereof which is driven across commutator segments 241, 242, 243, 244, 245, 246, 247, etc. This causes one or more resistors 252 to be connected in the series circuit starting with ground and passing through source 251, resistor 250 (which may be for example the heater of an attenuation or delay equalizer of the type used in the equalizers 52 and 56), one or more resistors 252, brush 240, crank 239, shaft 238, and clutch 235 to ground on the frame 233 supporting the clutch handle 234. Potentiometer No. 2 varies the current through heater 260 which is fed by current from the source 261 in the same manner. The motor 236 and the motor 237 operate as follows:

The $m$'th and $(M+1)$st pilot frequencies after having been received, filtered and adjusted at the level and phase adjusters 281 to 290 appear on trunks $m$ and $m+1$ respectively. Operation of the relays $M_1$ and $M_2$ applies the waves of these frequencies to demodulator 262 and one of them to the rectifier 263. The output of the rectifier 263 causes a polar relay 264 to operate, this latter being biased to have zero operating force when the rectifier 263 receives average power and no contact is then made. Any deviation from this power causes the relay 264 to flop to one side or the other. The bias of the relay may be provided by any suitable means such as, for example, the circuit including the resistance 265 in series with the source 266 and biasing winding of the relay 264. The operation of the armature of the relay 264 to its left-hand side connects source 267 in a circuit starting with ground and which passes through the source 267, the armature of the relay 264, connection 268, and the field winding of the motor 236 back to ground while the operation of the armature of the relay 264 to its right-hand position completes a circuit starting with ground and passing through the source 269, the armature of the relay 264, connection 268, and motor 236 to ground. Since the sources 267 and 269 are oppositely polarized, the question of which source is included in the circuit with the field winding of the motor 236 determines the direction of rotation of this motor, and the consequent adjustment of potentiometer No. 1 (element 253) which controls an attenuation equalizer of the type used in equalizer 52 or 56.

Demodulator 262 (in cooperation with the low-pass filter 271) puts out a frequency 2F equal to the difference between the two adjacent pilot frequencies and, as previously explained, any sudden phase shift thereof causes a shift in the difference frequency equal to the increment in phase shift between the pilot frequencies. Another demodulator similar to demodulator 262 and which is called demodulator No. 173 is fed by any two adjacent pilot frequencies whose relative phase increment it is desired to use for a standard. The direct current output of the phase detector 270 is a measure of the inequality of the phase increments and therefore of delay distortion. Phase detector 270 is the same as the one shown in Fig. 8 except that there is no biasing battery (such as the battery 220) needed. The polar relay 271 then operates the motor 237 in a direction suitable for changing the setting of potentiometer No. 2 (shown as box 254) until the delay inequality is compensated. This is accomplished by the oppositely polarized sources 272 and 273 a selected one of which is connected in a series circuit (starting with ground and including the connection 274, and the field winding of the motor 237 which is connected to ground) when the polar relay 271 is operated to either its right-hand or left-hand position.

After a reasonable time has elapsed and the adjustments are complete, motors 236 and 237 stop and the brush 231 passes from the $m$'th switching circuit (shown in Fig. 9) to the $(m+1)$st switching circuit (not shown but which is similar to the $m$'th switching circuit shown in Fig. 9) where a similar process is repeated, using the $(m+1)$st and $(m+2)$nd pilot frequencies to control the same motors 236 and 237 while they operate the $(m+1)$st sections of the equalizers in the boxes 52 and 56.

The effect of this switching scheme, as shown in the table below, is to eliminate about 188 demodulators, 188 phase detectors, 380 oscillators and 190 rectifiers, or a total of 946 active devices, adding, however, 3 motors and 191 switching circuits, in Cases I and II. In Case III, only 2 motors are required as motor No. 2 (element 237) can be omitted. The net saving is about 752 active devices in Cases I and II and 188 in Case III, as shown in the table given immediately below:

*Table*

[Approximate amount of major apparatus for one mop-up equalizer, $2F=13.23$ kc, $N=191$.]

| | Case I | Case II | Case III |
|---|---|---|---|
| *Passive Networks* | | | |
| Narrow Band Filters | 766 | 384 | 384 |
| Low Pass Filters | 190 | 190 | -------- |
| Manual Attenuators | 763 | 572 | 382 |
| Manual Phase Shifters | 572 | 381 | 191 |
| Hybrid Coil | 1 | 1 | 1 |
| Wide Band Equalizer | -------- | 1 | 1 |
| Automatic Tuned Circuits | 380 | 380 | 191 |
| Totals | 2,672 | 1,909 | 1,150 |
| Saving in Low Pass Filters due to Switching (see note below) | 188 | 188 | -------- |
| Remainder | 2,484 | 1,721 | 1,150 |
| *Active Apparatus:* | | | |
| Temperature Controls | 2 | 2 | 2 |
| Amplifiers | 193 | 3 | 3 |
| Demodulators | 190 | 190 | -------- |
| Oscillators | 380 | 380 | 191 |
| Rectifiers | 191 | 191 | 191 |
| Phase Detectors | 189 | 189 | -------- |
| Harmonic Generator | 1 | 1 | 1 |
| Multivibrators | 1 | 2 | 2 |
| Totals | 1,147 | 958 | 390 |
| Saving In Active Apparatus due to Switching (see note below) | 562 | 562 | 188 |
| Remainder | 585 | 396 | 202 |
| Grand Totals (Active plus Passive): | | | |
| Without switching | 3,819 | 2,867 | 1,540 |
| With switching | 3,069 | 2,117 | 1,352 |

*Case I.*—Figures 1 to 8 inclusive.

*Case II.*—Same as Case I with limitations in carrier frequency and in flexibility of adjustment of relative phases and amplitudes of pilot frequencies, and reduction in number of amplifiers.

*Case III.*—Same as Case II omitting separate delay equalization.

NOTE.—Switching arrangement per Fig. 9 except motor No. 2, magnets $M_2$, and potentiometers No. 2 are omitted for Case III. Phase detectors, demodulators, and low-pass filters of Figs. 7 and 12 are also omitted in Case III; and the phase shifting parts of phase and level adjusters are also omitted in Case III.

N pilot frequencies need not be transmitted simultaneously if only a few are used at a time, and the switching arrangement shown in Fig. 9 makes possible a reduction in load upon the line and, therefore, in possible modulation trouble, if, in addition, selective switching of pilot frequencies is done at the sending end. Synchronous switching is unnecessary if relays are utilized to operate the receiving end devices instead of the commutator. Relays to be activated by pilot frequencies might require some sort of detectors (these items are not included in the table). Switching of pilot frequencies at the sending end can be done at the input of the narrow band filters of Fig. 1, that is, filters 20 to 30 and 41 to 50, in order to limit the frequency content of transients upon the line. There are usually four pilot frequencies simultaneously on the line in order to keep one phase detector busy but if separate delay adjusters are unnecessary there need be only one pilot frequency on the line at one time. This, of course, does not include pilot frequencies to control the basic equalizers.

Various changes can be made in the various embodiments described above without departing from the spirit of the invention the scope of which is indicated in the claims. A divisional application, Serial No. 105,517, filed July 19, 1949, and which issued as Patent 2,550,595 on April 24, 1951, contains claims to an attenuation equalizer of the type shown in Fig. 5, and another divisional application, Serial No. 105,518, also filed July 19, 1949, and which issued as Patent 2,550,596 on April 24, 1951, contains claims to an attenuation equalizer of the type shown in Fig. 10.

What is claimed is:

1. In combination, a broad band transmission path for television signals produced by scanning a field along elemental lines in succession, means for generating oscillations of a standard frequency, means for deriving from said standard frequency oscillations a multiplicity of harmonic frequency oscillations, means for selecting from said multiplicity of oscillations a number of pilot frequency waves of different frequencies each one spaced from an adjacent one by the line scanning frequency and located in a portion of the band which contains inappreciable television signal energy, means for transmitting said pilot frequency waves to a receiving station over said transmission path which produces attenuation and envelope delay distortions, means at the receiving station under control of said pilot frequency waves to produce correcting increments of loss and envelope delay of the proper magnitudes and at the respective pilot frequencies to give substantially flat compensations of the attenuation versus frequency and envelope delay versus frequency characteristics of said transmission path, and means for inserting said correcting increments into the transmission path to give said substantially flat compensations.

2. In combination, a broad band transmission path for television signals produced by scanning a field along elemental lines in succession, means for generating oscillations of a standard frequency, means for deriving from said standard frequency oscillations a multiplicity of harmonic frequency oscillations, means for selecting from said multiplicity of oscillations a number of pilot frequency waves of different frequencies each one spaced from an adjacent one by the line scanning frequency and located in a portion of the band which contains inappreciable television signal energy, means for transmitting said pilot frequency waves to a receiving station over said transmission path which produces envelope delay distortions, means at the receiving station under control of said pilot frequency waves to produce correcting increments of envelope delay of the proper magnitudes and at the respective pilot frequencies to give substantially flat compensation of the envelope delay versus frequency characteristic of said transmission path, and means for inserting said correcting increments into the transmission path to give said substantially flat compensation, said last two means including a delay distortion equalizer through which all said pilot frequency waves are passed and which equalizer includes a plurality of parallel circuits each comprising a thermistor having a heater, and means for deriving from each pair of adjacent pilot frequency waves a direct current representative of the envelope delay distortion over the frequency band between said pair of pilot frequencies for controlling the temperature of said heater.

3. In combination, a broad band transmission path for television signals produced by scanning a field along elemental lines in succession, means for generating oscillations of a standard frequency, means for deriving from said standard frequency oscillations a multiplicity of harmonic frequency oscillations, means for selecting from said multiplicity of oscillations a number of pilot frequency waves of different frequencies each one spaced from an adjacent one by the line scanning frequency and located in a portion of the band which contains inappreciable television signal energy, means for transmitting said pilot frequency waves to a receiving station over said transmission path which produces attenuation distortions, means at the receiving station under control of said pilot frequency waves to produce correcting increments of loss of the proper magnitude and at the proper frequencies to give substantially flat compensation of the attenuation versus frequency characteristic of said transmission path, and means for inserting said correcting increments into the transmission path to give said substantially flat compensation, said last two means including an amplifier through which all said pilot frequency waves are passed, an attenuation equalizer connected in a feedback circuit between the output and input of said amplifier and which attenuation equalizer comprises a plurality of parallel circuits tuned to the respective pilot frequencies and each comprising a thermistor and a heater, means for deriving from each pair of adjacent pilot frequency waves a direct current representative of the attenuation distortion over the frequency band between said pair of pilot frequencies, and means for utilizing all of the direct current control signals thereby produced to control the magnitudes of the correcting increments applied to the transmission path to correct for said attenuation distortion.

4. In combination, a broad band transmission path for television signals produced by scanning a field along elemental lines in succession, means for transmitting a plurality of pilot frequency waves over said path, each of said pilot frequencies being spaced from an adjacent pilot frequency by the line scanning frequency and located in a portion of the band which contains inappreciable television signal energy, and means for utilizing each of said pilot frequency waves to adjust separate networks controlling the envelope delay and the attenuation of said path about that frequency only, said last mentioned means including switching apparatus for adjusting said separate networks in rotation.

5. In combination, a broad band transmission path for television signals produced by scanning a field along elemental lines in succession, means for generating oscillations of a standard frequency, means for deriving from said standard frequency oscillations a multiplicity of harmonic frequency oscillations, means for selecting from said multiplicity of oscillations a number of pilot frequency waves of different frequencies each one spaced from an adjacent one by the line scanning frequency and located in a portion of the band which contains inappreciable television signal energy, means for transmitting said pilot frequency waves to a receiving station over said transmission path which produces envelope delay distortions, means at the receiving station under control of said pilot frequency waves to produce correcting increments of envelope delay of the proper magnitudes and at the respective pilot frequencies to give substantially flat compensation of the envelope delay versus frequency characteristic of said transmission path, and means for inserting said correcting increments into the transmission path to give said substantially flat compensation, said control being afforded by means including a plurality of parallel circuit branches each of which passes a pilot frequency and each of which comprises, serially, a demodulator, a low-pass filter, and means to compare the phase of the signal in each of said plurality of parallel branches with the phase of the signal in each adjacent branch so as to yield control signals whose magnitude is representative of the envelope delay distortion over each frequency band between each pair of pilot frequencies.

6. In combination, a broad band transmission path for television signals produced by scanning a field along elemental lines in succession, means for generating oscillations of a standard frequency, means for deriving from said standard frequency oscillations a multiplicity of harmonic frequency oscillations, means for selecting from said multiplicity of oscillations a number of pilot frequency waves of different frequencies each one spaced from an adjacent one by the line scanning frequency and located in a portion of the band which contains inappreciable television signal energy, means for transmitting said pilot frequency waves to a receiving station over said transmission path which produces attenuation distortions, means at the receiving station under control of said pilot frequency waves to produce correcting increments of loss of the proper magnitudes and at the respective pilot frequencies to give substantially flat compensation of the attenuation versus frequency characteristic of said transmission path, and means for inserting said correcting increments into the transmission path to give said substantially flat compensation, said control being afforded by means including a plurality of parallel circuits each of which passes a pilot frequency and each of which comprises, serially, a high frequency attenuator of constant impedance, a rectifier, and an oscillator of variable output controlled by the output of said rectifier.

7. In combination, a broad band transmission path for television signals produced by scanning a field along elemental lines in succession, means for transmitting a plurality of pilot frequency waves over said path, each of said pilot frequencies being spaced from an adjacent pilot frequency by the line scanning frequency and located in a portion of the band which contains inappreciable television signal energy, and means for utilizing each of said pilot frequency waves to adjust both the envelope delay and the attenuation of said path about that frequency only.

KENNETH W. PFLEGER.

REFERENCES CITED

The following references are of record in the file of this patent:

UNITED STATES PATENTS

| Number | Name | Date |
|---|---|---|
| 1,446,752 | Kendall | Feb. 27, 1923 |
| 1,985,046 | Marrison | Dec. 18, 1934 |
| 2,246,307 | Krist | June 17, 1941 |
| 2,254,205 | Bollman | Sept. 2, 1941 |
| 2,348,572 | Richardson | May 9, 1944 |
| 2,362,359 | Darlington | Nov. 7, 1944 |
| 2,374,872 | Lundry | May 1, 1945 |
| 2,379,744 | Pfleger | July 3, 1945 |
| 2,444,063 | Pfleger | June 29, 1948 |
| 2,465,531 | Green | Mar. 29, 1949 |